United States Patent [19]

Morrison

[11] 4,285,517

[45] Aug. 25, 1981

[54] ADAPTIVE MICROCOMPUTER CONTROLLED GAME

[75] Inventor: Howard J. Morrison, Deerfield, Ill.

[73] Assignee: Marvin Glass & Associates, Chicago, Ill.

[21] Appl. No.: 10,938

[22] Filed: Feb. 9, 1979

[51] Int. Cl.³ .............................................. A63B 71/06
[52] U.S. Cl. ................................................... 273/1 GC
[58] Field of Search ............ 273/1 E, 85 G, DIG. 28, 273/138 A, 237; 340/384 R, 384 E; 434/236

[56] References Cited

U.S. PATENT DOCUMENTS

| | | | |
|---|---|---|---|
| 3,503,608 | 3/1970 | Ylinen | 273/1 E |
| 3,770,269 | 11/1973 | Elder | 273/1 E |
| 4,000,489 | 12/1976 | Bench | 273/1 E |
| 4,015,846 | 4/1977 | Runte et al. | 273/DIG. 28 |
| 4,017,072 | 4/1977 | Kurtz | 273/237 |
| 4,060,242 | 11/1977 | Huang et al. | 273/1 E |
| 4,095,785 | 6/1978 | Conner | 273/1 E |
| 4,162,792 | 7/1979 | Chang et al. | 273/86 B |

OTHER PUBLICATIONS

*Touch-Me Operating and Maintenance Manual;* Published by Atari, Inc.; 1974; pp. 1-8.
*Playthings;* Feb., 1979; p. 275.

Primary Examiner—Robert W. Michell
Assistant Examiner—Arthur S. Rose
Attorney, Agent, or Firm—Mason, Kolehmainen, Rathburn & Wyss

[57] ABSTRACT

An adaptive game utilizes a microprocessor for generating a random audible or visual stimulus which must be responded to by a plurality of players. The response generally requires the players to estimate a time interval, a number of events, a tone frequency or the like. The microprocessor then correlates play with one or more players by determining the appropriateness of a player's response, assigning a score to the response and keeping score. In addition, the microprocessor senses the level of skill of the players by observing the score of the highest scoring player and adjusting the level of difficulty in accordance with the value of the highest score.

44 Claims, 13 Drawing Figures

| LEVEL OF DIFFICULTY | ADAPT COUNT | TONE SEQUENCE LENGTH | TONE DURATION |
|---|---|---|---|
| 1 | 1 or 2 | 3 to 11 | 0.171 secs |
| 2 | 3 or 4 | 4 to 12 | 0.103 secs |
| 3 | 5, 6 or 7 | 6 to 14 | 0.103 secs |
| 4 | 8, 9 or 10 | 8 to 16 | 0.051 secs |
| 5 | 11, 12, 13 or 14 | 10 to 18 | 0.051 secs |
| 6 | 15 or 16 | 8 to 16 | 0.025 secs |

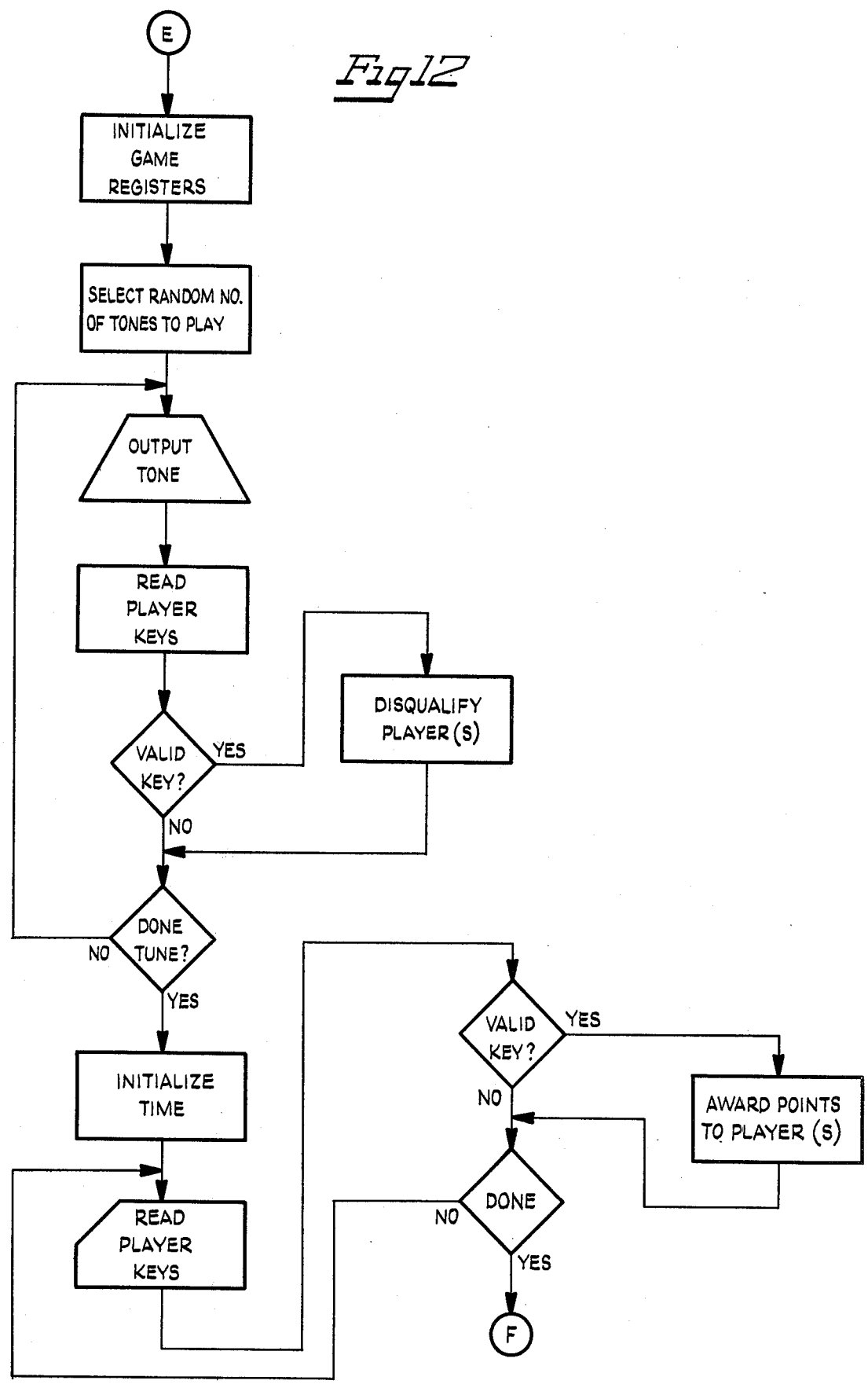

ADAPTIVE MICROCOMPUTER CONTROLLED GAME

BACKGROUND OF THE INVENTION

1. Field of the Invention

This invention relates generally to games, and more particularly to electronic board games that require an estimate of the stimulus provided by the game to be generated by the participants, and which provide audible and visual indications of the progress of the game while adjusting the level of difficulty of the game in accordance with the response of the players.

2. Description of the Prior Art

Electronic board games are known. Such games require, for example, a sequence of events to be repeated, a correlation between an input and an output to be determined, or a particular response to a particular stimulus to be provided. However, none of the prior art electronic board games require quantities of time, events or frequencies to be measured, nor are such prior art games adaptive in the sense that they adjust the difficulty of play in accordance with the ability of the players.

SUMMARY OF THE INVENTION

Accordingly, it is an object of the present invention to provide an electronic board game that provides a stimulus to a plurality of players, the value of which stimulus must be estimated by the players.

It is another object of the present invention to provide an electronic board game that automatically adapts the level of difficulty of play to the level of skill of the players.

In accordance with a preferred embodiment of the invention, there is provided a game device having a keyboard controlling a plurality of push-button switches. A visual display is provided, as well as an audio transducer, both being controlled by a microprocessor. Each of the push-button switches is designed to be operated by a single player in response to an audible or visual stimulus from the audio transducer or video display.

In operation, the microprocessor generates a random event which is communicated to the players as a light pattern on a visual display or as an audible tone or sequence of events by the transducer. The players must then respond to the stimulus thus provided and estimate the value of a particular feature of the stimulus provided, such as recognize a light pattern that was provided when it is subsequently repeated, estimate the frequency of a tone provided, estimate the number of beats or light flashes provided, estimate a particular tonal sequence or pattern, or the like. A Gamble Option is also provided which provides each player with a higher score for a correct estimate, but no score for a close, wrong estimate. If the Gamble Option is not elected, a player receives a lower score for a correct estimate than would be received had the Gamble Option been selected, but also receives some points for an incorrect but close estimate. The microprocessor also monitors the score of the leading player and adjusts the level of difficulty of the game if the lead of the leading player becomes excessive. Such a difficulty increase is accomplished, for example, by reducing the length of time that the stimulus is provided, by increasing the speed at which a stimulus comprising a sequence of events is presented, by requiring the players to respond to the stimulus more rapidly, or by a combination of the various difficulty increasing methods.

BRIEF DESCRIPTION OF THE DRAWING

These and other objects and advantages of the present invention will become readily apparent upon consideration of the following detailed description and accompanying drawing, wherein:

FIGS. 5-13 are flow charts illustrating the logic sequences performed by the microprocessor that controls the operation of the board game.

DETAILED DESCRIPTION OF THE PREFERRED EMBODIMENT

Figure 1:
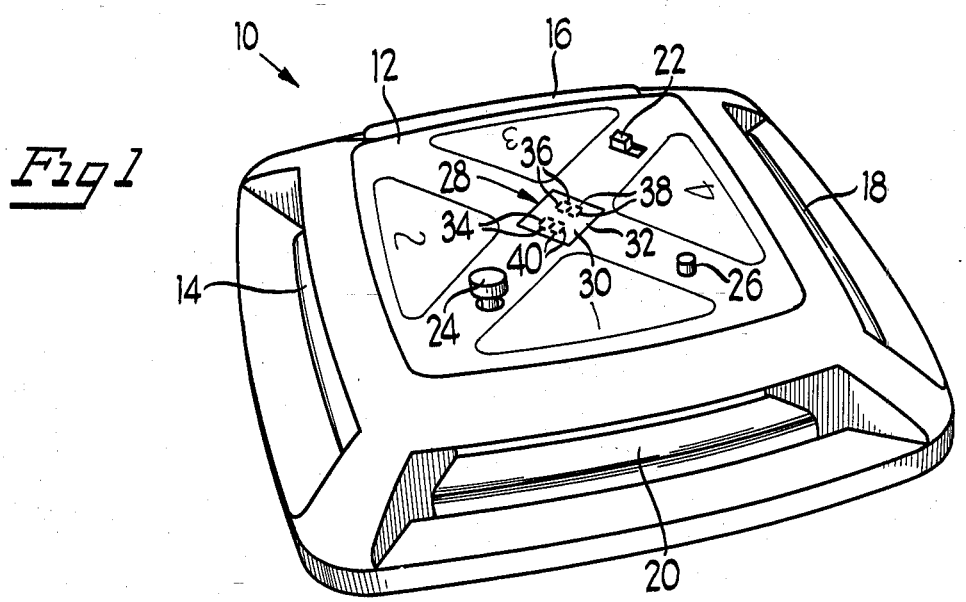
FIG. 1 is a top view of the electronic board game according to the invention.

Referring now to the drawing, with particular attention to FIG. 1 there is shown a preferred embodiment of the electronic board game generally designated by the reference numeral 10. The game 10 is enclosed in a housing 12 that contains four player-actuated switches 14, 16, 18 and 20, a power-on switch 22, a start switch 24 and a test switch 26. A dual seven-segment display 28 containing two seven-segment numeric displays 30 and 32 is also mounted on the housing and rotated at an angle of approximately 45° with respect to the player-actuated push buttons 14, 16, 18 and 20 so that the corner-most segments of the dual seven-segment display 28 form arrows pointing at the four player-actuated push-button switches 14, 16, 18 and 20. The four pairs of segments forming the arrows are designated by the reference numerals 34, 36, 38 and 40.

Figure 2:
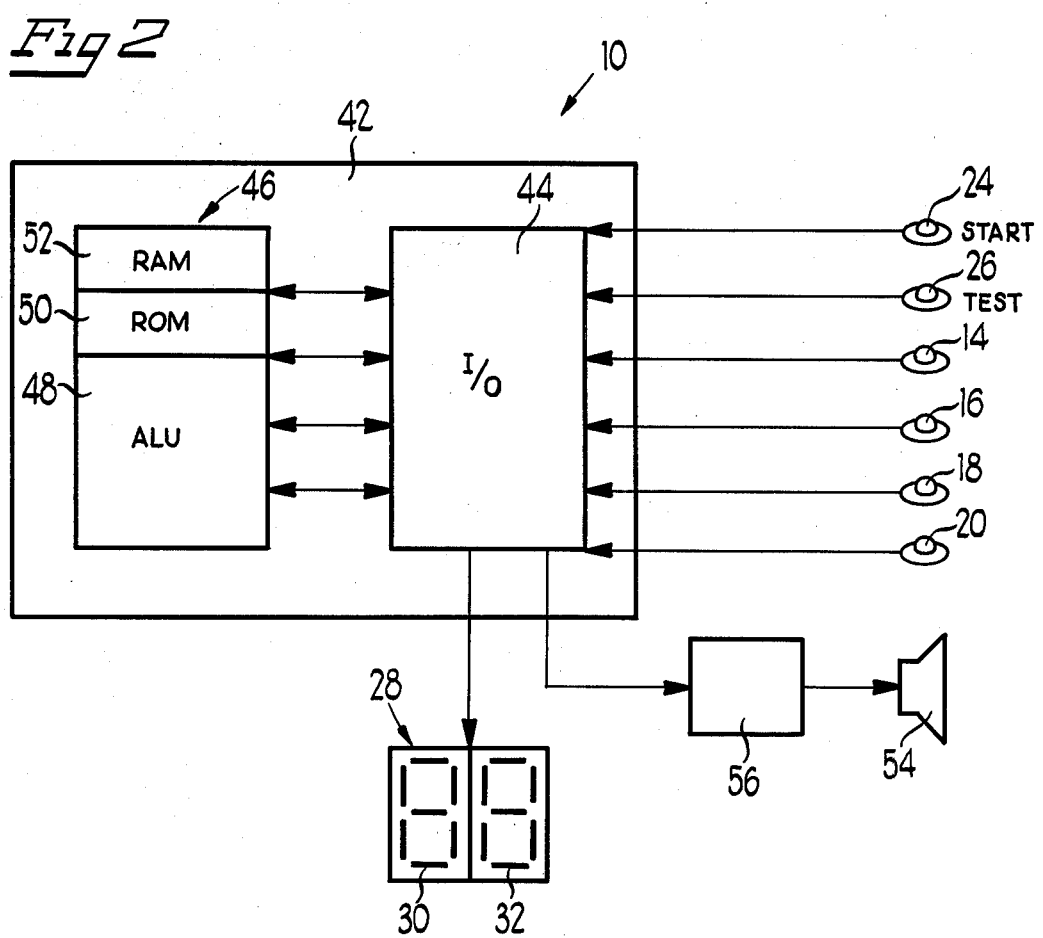
FIG. 2 is a block diagram of the electronic board game according to the invention.

Referring now to FIG. 2, the game 10 utilizes a microprocessor 42 having an input/output section 44 for connecting the start and test switches 24 and 26 and the four player-actuated push-button switches 14, 16, 18 and 20 to a computing device 46 having an arithmetic logic unit 48, a read-only memory 50 and a random-access memory 52. The arithmetic logic unit 48 processes the inputs received from the various input switches in accordance with the rules of the game selected from the read-only memory 52. The particular game selected is selected via a random auto-selection program so that the processor decides which one of the several games stored in the read-only memory is to be played each round. The arithmetic logic unit 48 also controls the operation of the dual seven-segment numeric display 28 and a loud speaker 54 via the input/output device 44 and a loud speaker drive circuit 56. The load speaker 54 and the dual seven-segment numeric display 28 are controlled in accordance with the rules of the games selected by the microprocessor.

When one of the games stored in the read-only memory 50 is selected by the processor, the arithmetic logic unit 48 operates on the sampled inputs from the group of four player-actuated push-button switches 14, 16, 18 and 20 to perform the necessary arithmetic logic steps on the inputs and to store the necessary data such as the operation of the keyswitch at the correct time during the execution of a particular game in the random-access memory 52. The arithmetic logic unit 48 also controls the input/output device 44 to provide the necessary responses to the game players by appropriately actuating the various segments of the dual numeric displays 30 and 32 and producing the appropriate tone sequences or melodies through the loud speaker 54.

Figures 3, 4:
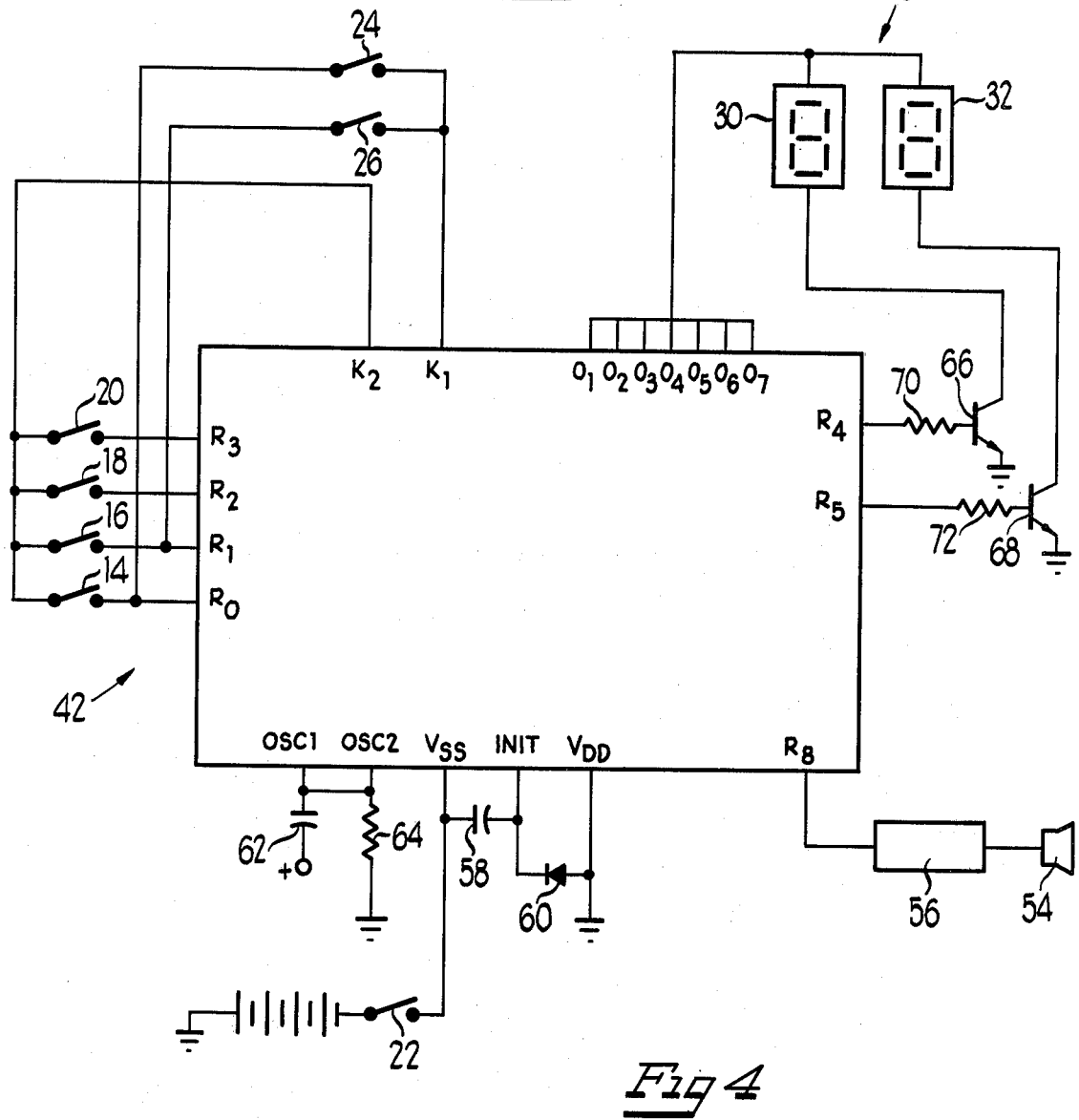
FIG. 3 is a schematic diagram of the electronic board game according to the invention.
FIG. 4 is a table illustrating the operation of the adaptive level of difficulty adjusting feature of the invention.

Referring now to FIG. 3, the microprocessor 42 is readily implemented on a single chip using a large scale integrated circuit microprocessor as the main computing device. A TMS 1000 or a TMS 1100 single-chip microprocessor manufactured by Texas Instruments, Inc. is suitable for use as the microprocessor 42 and contains the input/output circuitry 44 and the computing device 46 illustrated in FIG. 2.

A time delay circuit comprising a capacitor 58 and a diode 60 are utilized to reset and initialize the operation of the microprocessor 42 each time the power is turned on by closing the switch 22. A timing circuit comprising a capacitor 62 and a resistor 64 controls the operation of the internal clock or oscillator of the microprocessor 42 which typically operates at approximately 300 kHz. The time delay circuit and the timing circuit described above are selected in accordance with the design data published in the TMS 1000 Series Data Manual published in December 1975 by Texas Instruments, Inc. Further, the microprocessor 42 is readily programmed in a manner described in the aforesaid data manual to perform the functions necessary to play the games described in a subsequent portion of the specification.

In operation and during play of the game, the microprocessor 42 monitors the state of the player-actuated pushbuttons 14, 16, 18 and 20, the game start switch 24 and the test switch 26 by sequentially energizing the outputs R0 through R3 while monitoring the inputs K1 and K2. The outputs R0 through R3 are connected to the keyswitches 14, 16, 18 and 20, respectively. Thus, when the output R0 is energized, the device monitors the state of the keyswitch 14 which selectively connects the output R0 to the input K2. For example, if the keyswitch 14 is actuated (i.e., closed) the R0 output energizes the K2 input. Such energization of the input K2 when the output R0 is energized is recognized by the input circuitry of the microprocessor 42 as the actuation of the keyswitch 14. Similarly, the outputs R1 through R3 are energized and the input K2 monitored to determine the states of the keyswitches 16, 18 and 20. Thus, an energization of the input K2 when one of the outputs R1, R2 and R3 is energized indicates that a respective one of the switches 16, 18 and 20 is closed. The start switch 24 is also connected to the output R0 and to the input K1. Thus, a closing of the start switch 24 is detected by the presence of an input signal to the input K1 at the time that the output R0 is energized. The test switch 26 is connected between the output R1 and the input K1, and a closing of the test switch 26 results in an input being applied to the input K1 when the output R1 is energized.

The outputs R4 and R5 sequentially energize the common cathodes of the display segments in the numeric displays 30 and 32, respectively, of the display 28 through respective NPN transistors 66 and 68. When one of the outputs R4 or R5 goes high, the high state is applied to the base of the respective transistors 66 and 68 through one of a pair of resistors 70 and 72 thereby causing the respective one of the transistors 66 and 68 to saturate and to ground the common cathodes of one of the displays 30 and 32. The O1 through O7 outputs of the microprocessor 42 are then utilized selectively to drive the desired anodes of the segments of the displays 30 and 32 in accordance with control signals received from the computing device 48. The outputs O1 through O7 control the display element 30 during the time that the R4 output is high and control the display element 32 during the time interval that the output R5 is high.

The various tones, sounds, razzes, laughs and melodies produced by the device are generated by the microprocessor 42, amplified by the amplifier 56 and reproduced by the loud speaker 54. In the embodiment illustrated in FIG. 3, the sounds are produced at the output R8, with the repetition rate of the output R8 being controlled to provide distinct tones and tone sequences including win or lose tones, an end of game winner song, an incorrect move sound, timing tones and other sounds as required by the various games.

As previously described, the electronic game is capable of playing many different games and variations of games, with the game played during each round being selected at random by the microprocessor 42. After the game is turned on by means of the switch 22 and the start switch 24 is depressed, the game asks "Who's playing?" by illuminating the pairs of segments 34, 36, 38 and 40 sequentially to thereby point lighted arrows successively at each of the four playing positions defined by the four player-actuated switches 14, 16, 18 and 20. Each player indicates his presence by pressing his bar once when his arrow is lit. Any non-player is ignored and out of play.

Once the computer has determined the number of players participating, it starts a game round. Each round consists of a game identification announcement, a "Gamble Option" poll, a challenge by the device, a player response and the announcement of scores, cumulatively, by individual players. After a short delay, a new game round starts. A time-out button (not shown) may be provided to permit interruptions in play. During such interruptions, all scores are retained and resumption of play may be initiated by pressing the time-out button again or by pressing the start button.

Each game that may be played by the device has a unique game identification announcement which may take the form of various tones, sounds or light patterns. Typical identification announcements are described in a following portion of the specification describing typical games that may be played by the device.

The device provides each player with a chance to select or not to select the Gamble Option during the Gamble Option poll following the game identification announcement. The Gamble Option permits a player to try to increase his score by increasing the number of points awarded for a correct response. However, the Gamble Option reduces the number of points awarded for close but not exact responses, and increases the penalty for highly erroneous responses. During the Gamble Option poll, the device asks "Do you want to gamble?" by sequentially pointing lighted arrows at each of the players. If a player wishes to select the Gamble Option, he depresses his one of the keyswitches 14, 16, 18 and 20 during the time interval that the lighted arrow is pointing toward him. If he does not wish to select the Gamble Option, he does nothing during this interval.

Typical games that may be played by the device are illustrated below:

| | | |
|---|---|---|
| Game: | "Time's Up" | |
| Identification Code: | Beep, three "ticks", then a finish beep. | |
| Gamble Option: | Successive arrows; press if yes. | |
| Challenge Round: | Beep, any number of "ticks", then a final beep. | |
| Response Round: | Beep, silent interval (longer than challenge), then razz. | |
| Mode of Response: | Press when interval equals interval between beeps in challenge. | |
| Scoring: | Best: No Gamble Option: | 2 and high tone |
| | Gamble Option: | 4 and high tone |
| | Next: But not over time | |
| | No Gamble Option: | 1 and low tone |
| | Gamble Option: | 0 and razz |
| | Other: Or over time | |
| | No Gamble Option: | 0 and razz |
| | Gamble Option: | minus 2 and laugh |

* * * *

| | | |
|---|---|---|
| Game: | "Beeper-Creeper" | |
| Identification Code: | Beeps and marching light pattern. | |
| Gamble Option: | Successive arrows; press if yes. | |
| Challenge Round: | Any number of beeps (e.g., from 3 to 16). | |
| Response Round: | Marching light pattern and beeps. | |
| Mode of Response: | Press when number of lights equals number of beeps in challenge. | |
| Scoring: | Best: No Gamble Option: | 2 and high tone |
| | Gamble Option: | 4 and high tone |
| | Next: No Gamble Option: | 1 and low tone |
| | Gamble Option: | 0 and razz |
| | Other: No Gamble Option: | 0 and razz |
| | Gamble Option: | minus 2 and laugh |

* * * *

| | | |
|---|---|---|
| Game: | "Think Blots" | |
| Identification Code: | Light bar pattern flashes three times. | |
| Gamble Option: | Successive arrows; press if yes. | |
| Challenge Round: | Light bar pattern: Any one of many possible. | |
| Response Round: | Three successive light bar patterns: May or may not include original challenge pattern. | |
| Mode of Response: | Press when see original challenge pattern, or don't press if don't see original challenge pattern. | |
| Scoring: | Best: No Gamble Option: | 2 and high tone |
| | Gamble Option: | 4 and high tone |
| | Next: None | |
| | Other: No Gamble Option: | 0 and razz |
| | Gamble Option: | minus 2 and laugh |

* * * *

| | | |
|---|---|---|
| Game: | "Itchy Finger" | |
| Identification Code: | (-- · --) (-- · --) (-- · --) (Rhythm phrase) (Three repeats) | |
| Gamble Option: | Successive arrows; press if yes. | |
| Challenge Round & Response Round: | Series of beeps in rhythmic cadence, stopping abruptly at some random point. | |
| Mode of Response: | Players race to press as soon as they perceive that no more beeps are forthcoming. | |
| Scoring: | Best: No Gamble Option: | 2 and high tone |
| | Gamble Option: | 4 and high tone |
| | Next: No Gamble Option: | 1 and low tone |
| | Gamble Option: | 0 and razz |
| | Other: Or false press | |
| | No Gamble Option: | 0 and razz |
| | Gamble Option: | minus 2 and laugh |

* * * *

| | | |
|---|---|---|
| Game: | "Hot Potato" | |
| Identification Code: | Arrow flashes in commutation (all four positions). | |
| Gamble Option: | Successive arrows; press if yes. | |
| Challenge Round & Response Round: | Arrow lights in one position and stays on for a very short time (e.g. 1 second). | |
| Mode of Response: | Player must press when arrow points to him before it goes off. If he is successful, arrow moves to another; if late, arrow flashes, razz, and he is eliminated. | |
| Scoring: | Best: Survivor | |
| | No Gamble Option: | 2 and high tone |
| | Gamble Option: | 4 and high tone |
| | Next: None | |
| | Other: Or false press | |

|  |  |  |
|---|---|---|
|  | No Gamble Option: | 0 and razz |
|  | Gamble Option: | minus 2 and laugh |
|  | * * * * |  |
| Game: | "Wild Pitch" |  |
| Identification Code: | Four tones in ascending pitch. |  |
| Gamble Option: | Successive arrows; press if yes. |  |
| Challenge Round: | Long tone; pitch is any one of a scale. |  |
| Response Round: | Three long tones which may or may not include original challenge tone. |  |
| Mode of Response: | Press when hear original challenge tone, or don't press if don't hear original challenge tone. |  |
| Scoring: | Best: No Gamble Option: | 2 and high tone |
|  | Gamble Option: | 4 and high tone |
|  | Next: None |  |
|  | Other: No Gamble Option: | 0 and razz |
|  | Gamble Option: | minus 2 and laugh |
|  | * * * * |  |
| Game: | "Mad Flasher" |  |
| Identification Code: | Marching light pattern. |  |
| Gamble Option: | Successive arrows; press if yes. |  |
| Challenge Round: | Any number of flashes (e.g. from 3 to 16). |  |
| Response Round: | Marching light pattern. |  |
| Mode of Response: | Press when the number of lights in the marching light pattern equals the number of flashes in challenge. |  |
| Scoring: | Best: No Gamble Option: | 2 and high tone |
|  | Gamble Option: | 4 and high tone |
|  | Next: No Gamble Option: | 1 and low tone |
|  | Gamble Option: | 0 and razz |
|  | Other: No Gamble Option: | 0 and razz |
|  | Gamble Option: | minus 2 and laugh |
|  | * * * * |  |
| Game: | "Remorse Code" |  |
| Identification Code: | Two audible "vees" (· · · --). |  |
| Gamble Option: | Successive arrows; press if yes. |  |
| Challenge Round: | One audible dot-dash group. |  |
| Response Round: | Three audible dot-dash groups which may or may not include the original challenge. |  |
| Mode of Response: | Press when hear original challenge, or don't press if don't hear original challenge. |  |
| Scoring: | Best: No Gamble Option: | 2 and high tone |
|  | Gamble Option: | 4 and high tone |
|  | Next: None |  |
|  | Other: No Gamble Option: | 0 and razz |
|  | Gamble Option: | minus 2 and laugh |
|  | * * * * |  |
| Game: | "Decisions, Decisions" |  |
| Identification Code: | All arrows flash three times. |  |
| Gamble Option: | Successive arrows; press if yes. |  |
| Challenge Round & Response Round: | Arrows flash, one at a time, in random order until arrow stops at one player. At same time, either one beep or none is heard. |  |
| Mode of Response: | If beep, arrow player only must press while his arrow is "on"; if no beep, all non-arrow players only must press. |  |
| Scoring: | Best: Survivor |  |
|  | No Gamble Option: | 2 and high tone |
|  | Gamble Option: | 4 and high tone |
|  | Next: None |  |
|  | Other: Drop-outs (eliminated as they err, by razz and light flash) |  |
|  | No Gamble Option: | 0 and razz |
|  | Gamble Option: | minus 2 and laugh |
|  | * * * * |  |

In scoring the above described games, the game ends when one player reaches a predetermined number of points, such as, for example, twenty-five points. When scoring games requiring an estimate of time intervals and numbers of events, the "best" score may be awarded for an exact estimate or for an estimate that is accurate within a predetermined tolerance. The "next" score may be awarded for estimates within a second greater tolerance.

In accordance with another important aspect of the invention, the device is programmed to change the level of difficulty of play by adapting the speed of play to the game participants' successes and failures. For example, the device keeps track of the best score among the game participants, and once the leader starts to pull ahead of his opponents, the device adjusts the level of difficulty upward by an amount proportional to the lead of the leader. The level of difficulty is adjusted by adding or subtracting one count from a number called an ADAPT COUNT. In general, when the highest scorer pulls ahead, a count is added to the ADAPT COUNT and a count is subtracted from the ADAPT COUNT if the leader falters. The ADAPT COUNT is entered into a table within the read-only memory which determines the number of tones to be generated in the next sequence and how long each tone should be. The game is made more difficult by increasing the length of the tone sequences and by making the tones shorter and more rapid.

At the beginning of a game, the ADAPT COUNT is zero and the next sequence to be generated is generated at a number 1 level of difficulty. In the present embodiment (FIG. 4), a number 1 level of difficulty sequence has a length of three to eleven tones and is played at a speed of 0.171 second per tone. This is a relatively short and slow sequence. If the player with the highest score after the first round scores one point, then the ADAPT COUNT is moved from zero to one and no change occurs in the level of difficulty. Even if this player scores two points and the ADAPT COUNT is increased to two, no change occurs in the level of difficulty. However, when the leader scores one or two more points, the ADAPT COUNT is increased to three or four, respectively, and the level of difficulty is moved to the next higher level. This causes the next generated sequence to be slightly longer (four to twelve tones) and somewhat faster (0.103 second). As the score of the leader increases further, the level of difficulty increases. Such an increase in the level of difficulty makes it more probable that the leader and the other players will make a mistake. Therefore, every time the leader gets a zero, the device subtracts a one from the ADAPT COUNT. Thus, after one or two zeros, the ADAPT COUNT drops enough to drop to the pace of the next lower level of difficulty.

The adaptive process is designed to allow the level of difficulty to increase rapidly if the leader scores high consistently; however, the system is designed to lower the level of difficulty at a slower rate. This is accomplished by adding a count to the adaptive count for each point increase in the leader's score while requiring more than one total miss to occur before the level of difficulty is lowered.

Figure 5:
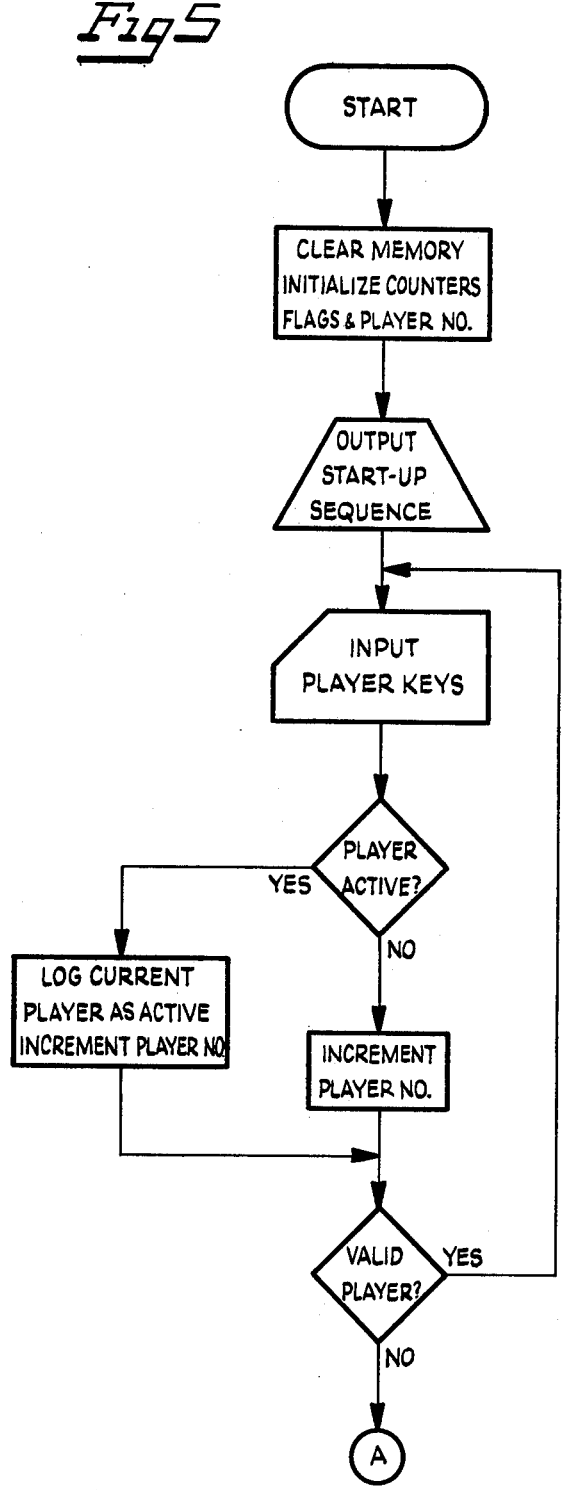
Figure 6:
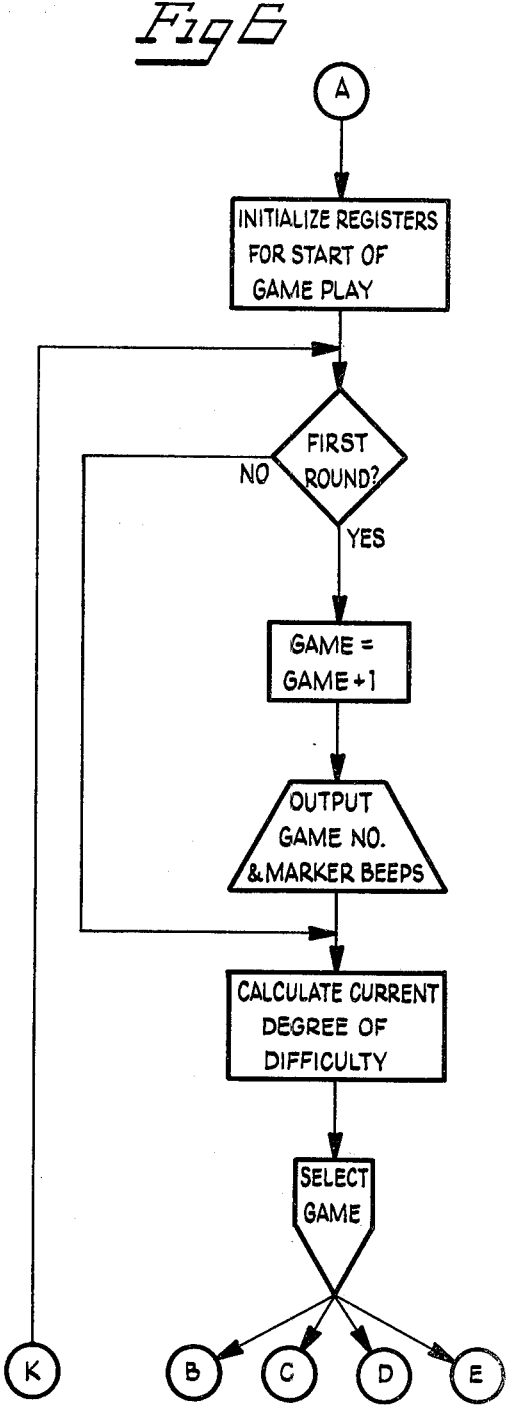

The initialization of play routine is illustrated in flow chart form in FIGS. 5 and 6. When the start button is pressed, the memory is cleared and the flags, counters and player number counters are initialized. Once this is done, the startup sequence wherein the arrows are successively pointed at the players is initiated. The system then inputs the players' responses to the moving arrows as indicated by a depression of the player keys. If a key has been depressed, the current player is logged active and the player number is incremented. If there has been no depression of the key, the current player is not logged as active and the player number is incremented. After incrementation, if the player number is less than four, indicating a valid player, the input from the next player key is inputted and the process is repeated. If the player number is greater than four indicating that all of the players have been logged, as indicated by an invalid player number, the registers for the start of game play are initialized (FIG. 6).

After the start of game play registers have been initialized, a determination is made whether the present round is the first round. If it is the first round, the game count is incremented one and a series of beeps are outputted. The current degree of difficulty is also calculated. If the round is not the first round, the degree of difficulty is calculated without incrementing the game number and outputting the marker beeps. One of the games playable by the machine is then selected at random. In the flow chart of FIG. 6, one of four games may be selected, but more or fewer than four games may be provided.

Figure 7:
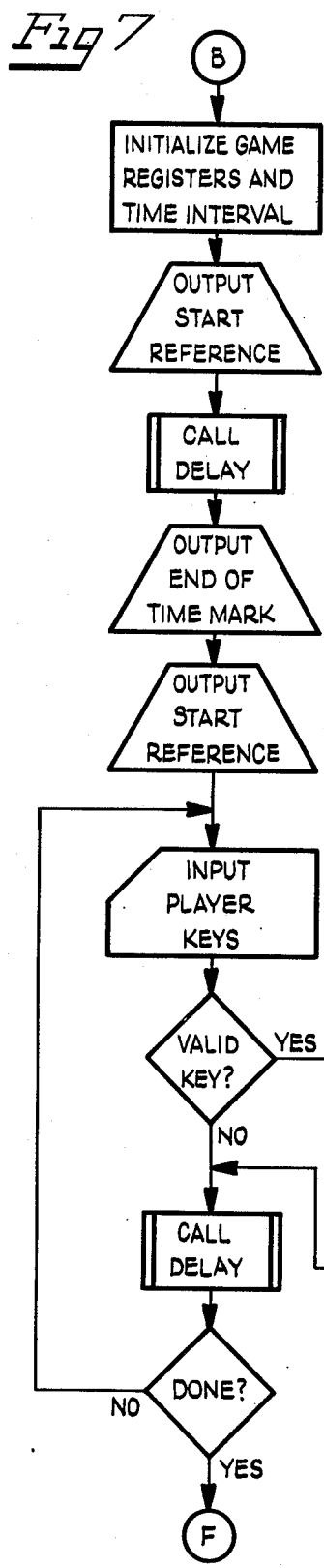
Figure 8:
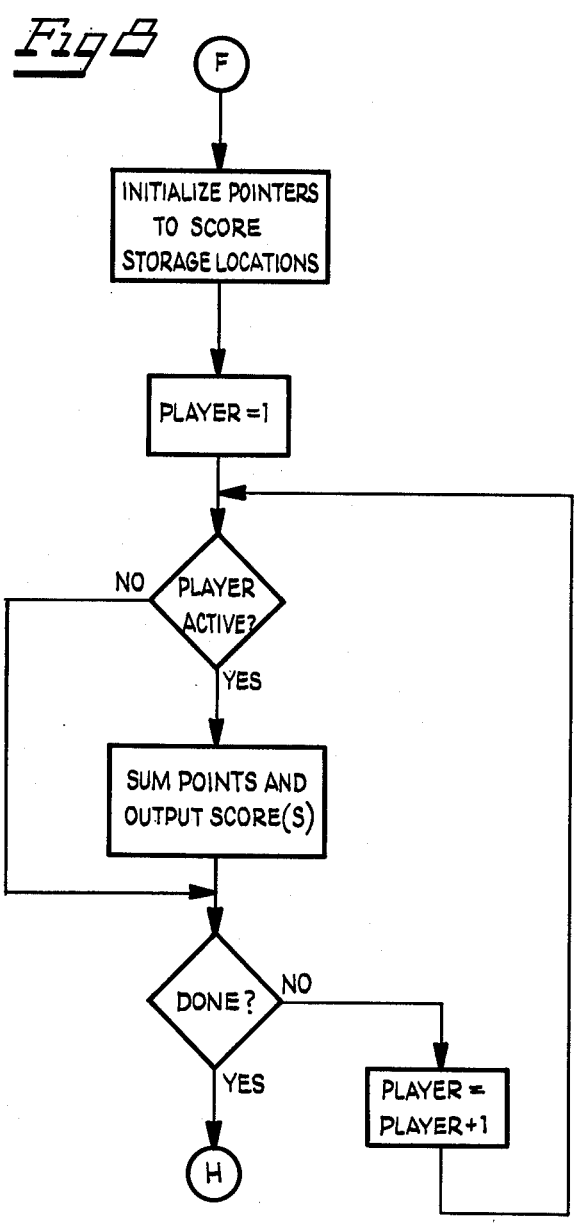

The routines for the first four games described in the specification, namely "Time's Up," "Beeper-Creeper," "Think Blots" and "Itchy Finger" are illustrated in FIG. 7. The routine for the "Time's Up" game is illustrated in FIG. 7, and requires a time interval to be estimated by the player. If the "Time's Up" game is selected, the game registers are initialized and the game identification announcement for "Time's Up" is displayed. A particular delay is then called at random and an end of time mark is outputted at the end of the time interval. The start reference is again outputted, and the player input keys are monitored. If the player inputs a valid key depression, the time interval between the output of the start reference and the depression of the key is compared with the delay time generated by the device, and points are awarded to the player based on the accuracy of his estimate and whether or not the Gamble Option was selected. If the key depression was not valid, no points are awarded. The scores are then stored cumulatively in storage locations alloted to each active player as shown in FIG. 8. Inactive player positions are ignored.

Figure 9:
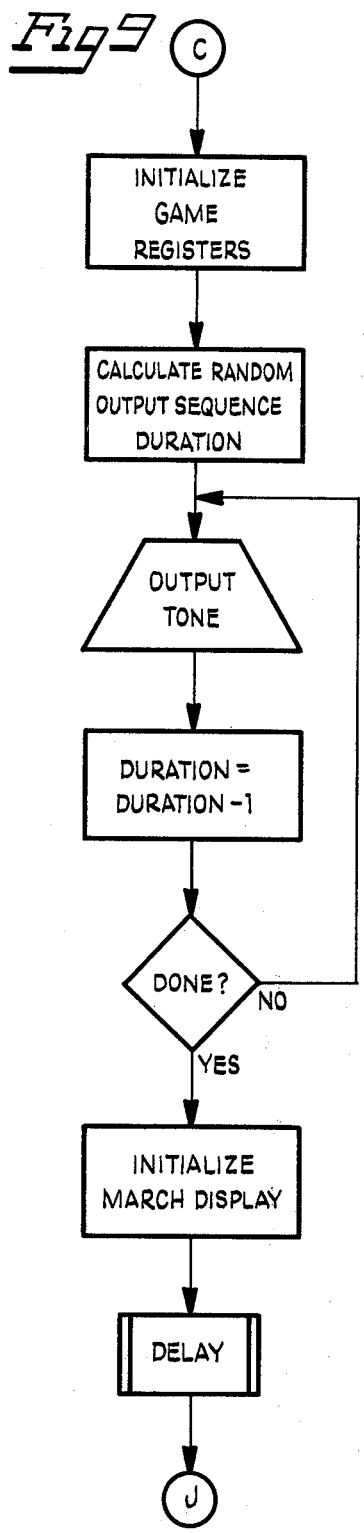
Figure 10:
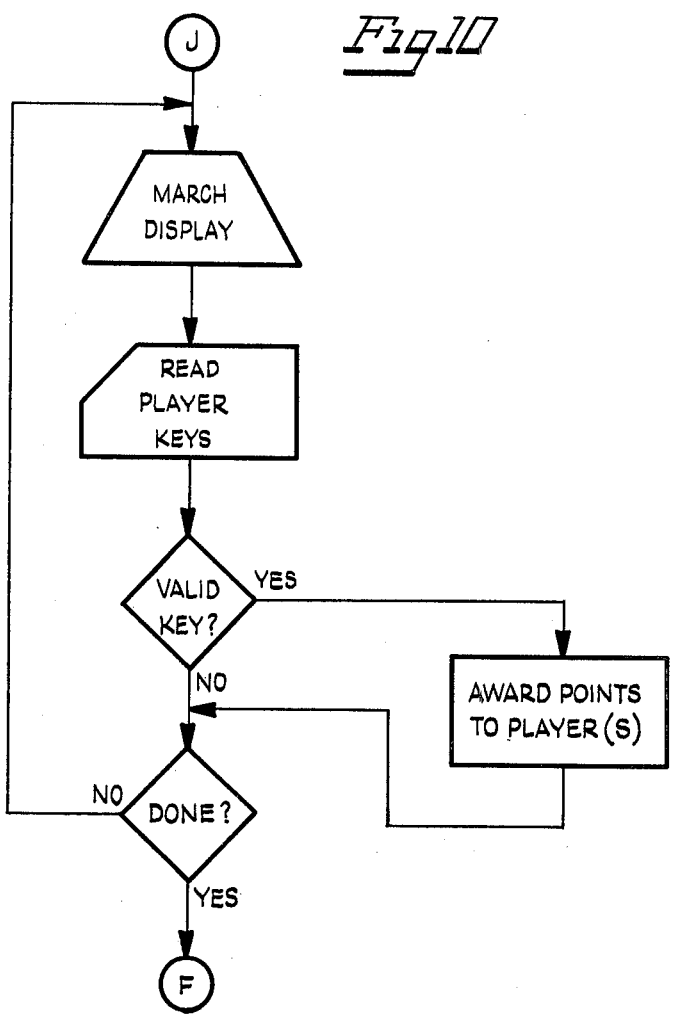

The flow chart for the "Beeper-Creeper" game is illustrated in FIGS. 9 and 10. When the "Beeper-Creeper" game is selected, the game registers are initialized and a random sequence is calculated. Output tones are then generated sequentially in response to the events in the random sequence, with each tone having a predetermined time duration. After all the tones have been sounded, and after a predetermined delay, various segments of the display 28 (FIG. 1) are energized in sequence and the player keys monitored. The sequential display of segments continues until a valid key depression is sensed, at which time points are awarded to the player(s) who has depressed his key when the number of lights in the light display sequence is equal to the number of beeps previously sounded. More points are awarded for an exact estimate than for an approximate estimate in accordance with the rules of the game and whether or not the Gamble Option was selected. The points are accumulated according to the logic sequence of FIG. 8.

Figure 11:
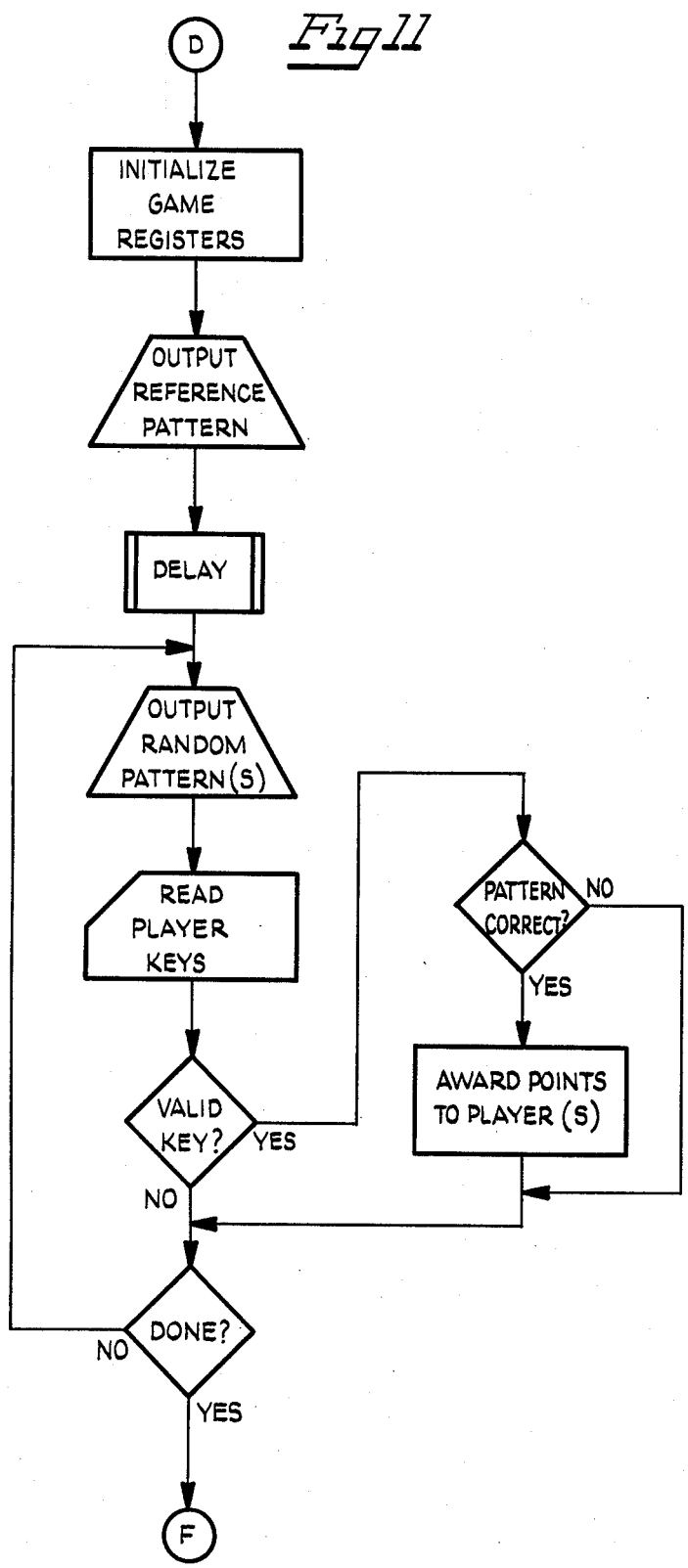

When the "Think Blots" game is selected, all game registers are initialized and an output reference pattern is displayed at random (FIG. 11). After a delay, several random patterns are sequentially displayed at random and the player keys are read. If a valid key depression occurs and the pattern being displayed at the time of the key depression is identical to the reference pattern, the appropriate points are awarded to the player. The sequence of the output random patterns is continued until completed. The number of points awarded are accumulated by the logic sequence of FIG. 8.

If the "Itchy Finger" game is selected, the game registers are initialized and the random number of tones to play are selected (FIG. 12). The tones are then outputted in sequence and the player keys read. If the player depresses a key before the sequence is completed, he is disqualified. The sequence continues until it has been completed, at which time a predetermined time interval is initialized. The keys of the players that have not been disqualified are then read and points are awarded to the players who depress their key within the predetermined time interval. The faster the player's response, the higher his score. The number of points awarded are again accumulated according to the logic sequence described in FIG. 8.

Figure 13:
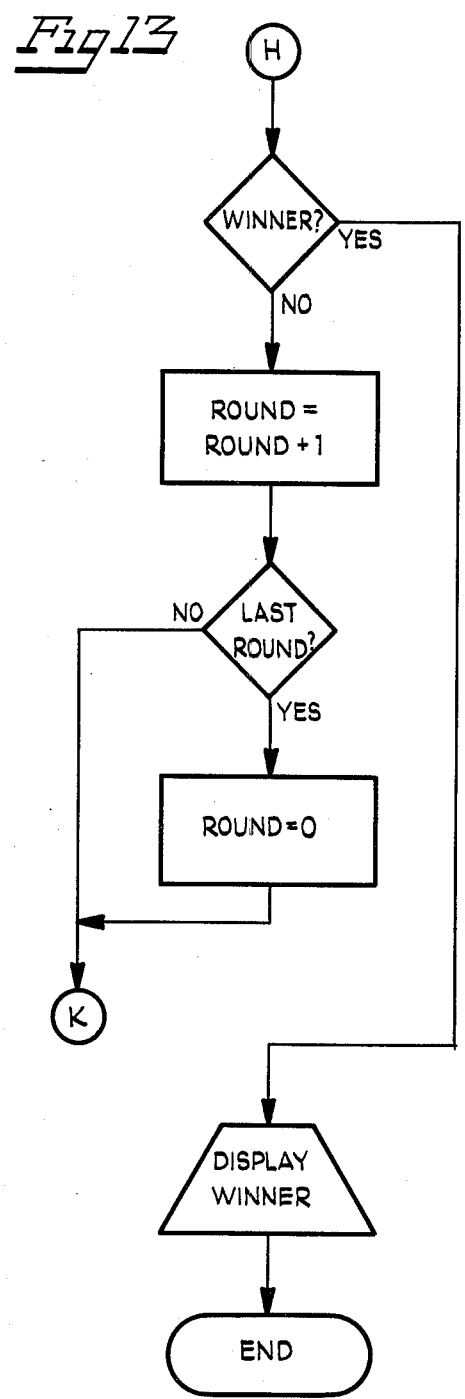

Each time new points are accumulated by the logic sequence of FIG. 8, a determination is made to determine whether or not there is a winner (FIG. 13). Such a determination can be made, for example, by determining whether any of the players has a sufficient number of points, such as, for example, 25 points. If a winner exists, the identity of the winner is displayed, for example, by pointing the arrow of the display 28 at the winner and displaying the winner's score and by producing the appropriate sound effects. If none of the participants has a sufficient score to qualify as a winner, the number of the round is incremented. If the round is not the last round, the next round is commenced. If it is the last round, the round number is reduced to zero and the next game is started.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A game device comprising:
   means for automatically generating a sensorially perceptible event, said event having a predetermined physical characteristic having a predetermined value;
   means for automatically generating a plurality of values, one of which is a simulation of said value;
   means actuable by a participant for entering into said device an estimate of when said predetermined value has been simulated by means of a single actuation of said participant actuable means; and
   means coupled to said participant actuable means and to said event generating means for comparing said value and said estimate and for providing a first indication if said estimate corresponds to said value within a predetermined margin or error and for generating a second indication if said estimate does not correspond with said value within said predetermined margin of error.

2. A game device as recited in claim 1 wherein said sensorially perceptible event is a tone and the value of said physical characteristic is the pitch of said tone.

3. A game device as recited in claim 2 wherein said means for generating a simulation of the value of said sensorially perceptible event includes means for repeating said tone, and said participant actuable means includes means for entering the pitch of said repeated tone into said device upon actuation of said partipant actuable means.

4. The game device of claim 1 wherein said player actuatable means includes a plurality of manually operable controls, each associated with one of a plurality of players.

5. The game device of claim 4 including a game housing with said manually operable controls mounted generally around the periphery of the housing to facilitate physical access by the players of the game.

6. The game device of claim 5 including means on the housing coupled to said comparing means for providing a score in response to said first and second indications.

7. The game device of claim 6 wherein said scoring means includes means for providing a cumulative score of a plurality of scores resulting from a sequence of sensorially perceptible events.

8. The game device of claim 7 wherein said scoring means comprises at least one 7-segment numeric display mounted on the housing so that the two cornermost segments of the display form arrows pointing toward the four manually operable controls.

9. The game device of claim 8 wherein said scoring means includes two 7-segment numeric displays.

10. The game device of claim 1 wherein said sensorially perceptible event is a plurality of tones and the value of said physical characteristic is the number of said tones.

11. The game device of claim 10 wherein said means for generating a simulation of the value of said sensorially perceptible event includes means for generating a timed sequence of events and said participant actuable means includes means for entering the number of said plurality of tones corresponding to one of the events of the timed sequence of events upon actuation of said participant actuable means.

12. The game device of claim 11 wherein said player actuatable means includes a plurality of manually operable controls, each associated with one of a plurality of players.

13. The game device of claim 12 including a game housing with said manually operable controls mounted generally around the periphery of the housing to facilitate physical access by the players of the game.

14. The game device of claim 1 or 13 including means responsive to the occurrence of said first indication for varying the rate of said sensorially perceptible events.

15. The game device of claim 14 including means on the housing coupled to said comparing means for providing a score in response to said first and second indications.

16. The game device of claim 15 wherein said scoring means includes means for providing a cumulative score of a plurality of scores resulting from a sequence of sensorially perceptible events.

17. The game of claim 16 wherein said scoring means comprises at least one 7-segment numeric display mounted on the housing so that the two cornermost segments of the display form arrows pointing toward the four manually operable controls.

18. The game device of claim 17 wherein said scoring means includes two 7-segment numeric displays.

19. The game device of claim 1 wherein said sensorially perceptible event is a pattern and the value of said physical characteristic is the physical arrangement of said pattern.

20. The game device of claim 19 wherein said player actuatable means includes a plurality of manually operable controls, each associated with one of a plurality of players.

21. The game device of claim 20 including a game housing with said manually operable controls mounted generally around the periphery of the housing to facilitate physical access by the players of the game.

22. The game device of claim 21 including means on the housing coupled to said comparing means for providing a score in response to said first and second indications.

23. The game device of claim 22 wherein said scoring means includes means for providing a cumulative score of a plurality of scores resulting from a sequence of sensorially perceptible events.

24. The game device of claim 23 wherein said scoring means comprises at least one 7-segment numeric display mounted on the housing so that the two cornermost segments of the display form arrows pointing toward the four manually operable controls.

25. The game device of claim 24 wherein said scoring means includes two 7-segment numeric displays.

26. The game device of claim 1 wherein said sensorially perceptible event is a tone and the value of said physical characteristic is the length of said tone.

27. The game device of claim 26 wherein the means for generating a simulation of the value of a sensorially perceptible event includes means for providing a signal indicating a time period and said participant actuable means includes means for entering the end of said time period.

28. The game device of claim 27 wherein said player actuatable means includes a plurality of manually operable controls, each associated with one of a plurality of players.

29. The game device of claim 28 including a game housing with said manually operable controls mounted generally around the periphery of the housing to facilitate physical access by the players of the game.

30. The game device of claim 29 including means on the housing coupled to said comparing means for providing a score in response to said first and second indications.

31. The game device of claim 30 wherein said scoring means includes means for providing a cumulative score of a plurality of scores resulting from a sequence of sensorially perceptible events.

32. The game device of claim 31 wherein said scoring means comprises at least one 7-segment numeric display mounted on the housing so that the two cornermost segments of the display form arrows pointing toward the four manually operable controls.

33. The game device of claim 32 wherein said scoring means includes two 7-segment numeric displays.

34. The game device of claim 7, 23 or 31 including means coupled to said means for providing a cumulative score to provide an end of game indication when said score equals a predetermined score.

35. The game device of claim 27 including means responsive to the occurrence of said first indication for varying the rate of said sensorially perceptible events.

36. The game device of claim 1 wherein said comparing means provides a third indication if said estimate corresponds to said value within a second predetermined margin of error other than zero.

37. The game device of claim 36 including means coupled to said comparing means for providing a score in response to said first, second and third indications.

38. The game device of claim 37 wherein said first indication is a predetermined score on said scoring means, said second indication is no score, and said third indication is a score less than said predetermined score.

39. The game device of claim 1 wherein the value of the event is randomly determined.

40. The game device of claim 1 wherein said simulation includes a real event and a deception event the value of only said real event corresponding to the value of said event.

41. The game device of claim 40 wherein the value of said deception event is randomly determined.

42. The game device of claim 40 wherein said real event and said deception event are generated in a random sequence.

43. The game device of claim 40 wherein a plurality of events are generated and a simulation generated for each of said events, said simulation generating means generating at least two deception events and occasionally failing to generate a real event, said failure to generate said real event being indicated by a player by a single actuation of said participant actuable means.

44. A microprocessor controlled portable game comprising:
a generally rectangular, portable housing;
a microprocessor within said portable housing;
four pushbuttons disposed in a rectangular pattern on said portable housing defining a longitudinal and transverse axis therefor;
means within said microprocessor for generating a sensorsially perceptible event, said event having a predetermined physical characteristic and a predetermined physical value;
means connected to said four pushbuttons for actuation by a participant for entering into said microprocessor an estimate of said predetermined value by means of a single actuation thereof;
comparator means for comparing the value of said estimate with said predetermined physical value;
means coupled to said comparing means for providing a score as a function of said estimate relative to said predetermined physical value; and
a seven-segment numeric display mounted on the housing so that each of the four pairs of cornermost segments of the seven-segment display forms an arrow which points generally outwardly toward one of said pushbuttons means within said microprocessor for independently illuminating at least one of said four pairs to identify a single player.

* * * * *